US012611789B2

(12) United States Patent
Calero

(10) Patent No.: US 12,611,789 B2
(45) Date of Patent: Apr. 28, 2026

(54) SMART STRAIGHT RAZOR

(71) Applicant: Jeovany Calero, Providence, RI (US)

(72) Inventor: Jeovany Calero, Providence, RI (US)

(*) Notice: Subject to any disclaimer, the term of this patent is extended or adjusted under 35 U.S.C. 154(b) by 123 days.

(21) Appl. No.: 18/799,667

(22) Filed: Aug. 9, 2024

(65) Prior Publication Data

US 2025/0050525 A1 Feb. 13, 2025

Related U.S. Application Data

(60) Provisional application No. 63/519,228, filed on Aug. 11, 2023.

(51) Int. Cl.
*B26B 21/40* (2006.01)
*B26B 21/16* (2006.01)
*B26B 21/52* (2006.01)

(52) U.S. Cl.
CPC .......... *B26B 21/4056* (2013.01); *B26B 21/16* (2013.01); *B26B 21/4031* (2013.01); *B26B 21/523* (2013.01); *B26B 21/526* (2013.01)

(58) Field of Classification Search
CPC . B26B 21/4056; B26B 21/4031; B26B 21/16; B26B 21/523; B26B 21/526
See application file for complete search history.

(56) References Cited

U.S. PATENT DOCUMENTS 2,099,605 A * 11/1937 High ........................ B26B 21/16 30/80
2,121,000 A * 6/1938 Anderson ............... B26B 21/16 30/40
2,192,362 A * 3/1940 Merlo ...................... B26B 21/08 30/32
2,479,788 A * 8/1949 Barnold .................. B26B 21/08 30/337
3,255,523 A * 6/1966 Robertson ............... B26B 21/10 30/32
3,308,533 A * 3/1967 Holohan ................. B26B 21/08 30/32
3,383,763 A * 5/1968 Strandfors .............. B26B 21/08 30/32
4,461,078 A * 7/1984 Carreker ............. B26B 21/4043 30/526
4,498,236 A * 2/1985 McIntyre .............. B26B 21/523 30/47
4,665,615 A * 5/1987 Martinez ................. B26B 21/10 30/53
5,313,706 A * 5/1994 Motta ................... B26B 21/227 30/47
6,164,290 A * 12/2000 Andrews ................ A45D 24/36 30/526
6,722,039 B2 * 4/2004 Kitano ..................... B26B 21/10 30/55
7,614,874 B2 * 11/2009 Mochizuki .............. F23Q 2/164 431/153
7,913,392 B2 * 3/2011 Rozenkranc ........ B26B 19/3886 30/32
7,926,183 B2 * 4/2011 Groh ....................... B26B 21/12 30/53

(Continued)

*Primary Examiner* — Sean M Michalski

(57) ABSTRACT

The present disclosure relates to a smart straight razor. Particularly, the smart straight razor includes motor-driven assemblies coupled to a blade tray assembly that is controlled by a blade controller for safely loading, ejecting, and precisely adjusting exposure and/or tilt of a razor blade.

20 Claims, 14 Drawing Sheets

(56) References Cited

U.S. PATENT DOCUMENTS

| | | | | |
|---|---|---|---|---|
| 9,364,961 | B2 * | 6/2016 | Lelieveld | B26B 21/4018 |
| 2002/0189105 | A1 * | 12/2002 | Kitano | B26B 21/10<br>30/53 |
| 2004/0181944 | A1 * | 9/2004 | Clark | B26B 21/525<br>30/337 |
| 2005/0252006 | A1 * | 11/2005 | Lopez | B26B 21/10<br>30/53 |
| 2008/0134511 | A1 * | 6/2008 | Salvatore | B26B 21/46<br>362/115 |
| 2012/0174409 | A1 * | 7/2012 | Lelieveld | B26B 21/227<br>30/34.2 |
| 2014/0096395 | A1 * | 4/2014 | Griner | B26B 21/10<br>30/40 |
| 2022/0118635 | A1 * | 4/2022 | Bozikis | B26B 21/4031 |
| 2023/0234252 | A1 * | 7/2023 | Hernandez | B26B 21/523<br>30/51 |
| 2023/0311351 | A1 * | 10/2023 | Hahn | B26B 21/521<br>30/32 |
| 2024/0033959 | A1 * | 2/2024 | Kokozidis | B26B 21/4031 |
| 2024/0238998 | A1 * | 7/2024 | Aspauza | B26B 21/4012 |

* cited by examiner

FIG. 3E
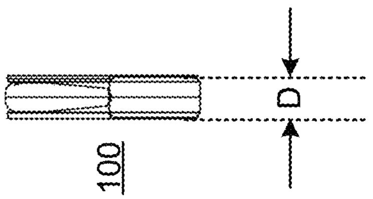
FIG. 3F
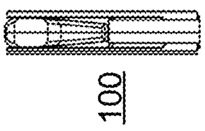
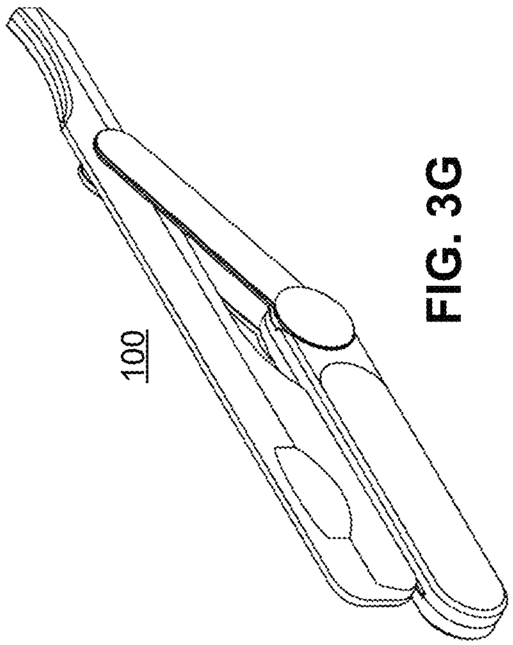
FIG. 3G
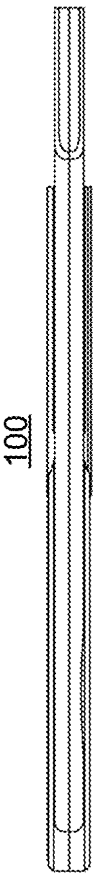
FIG. 3A
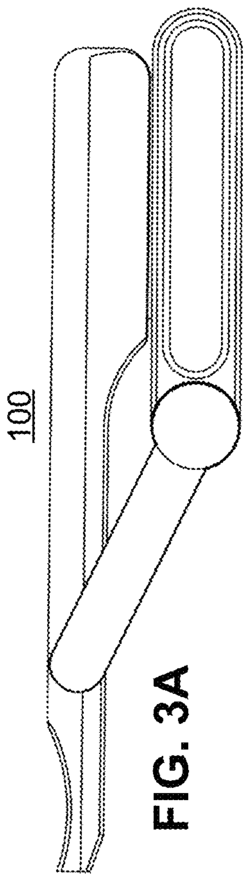
FIG. 3B
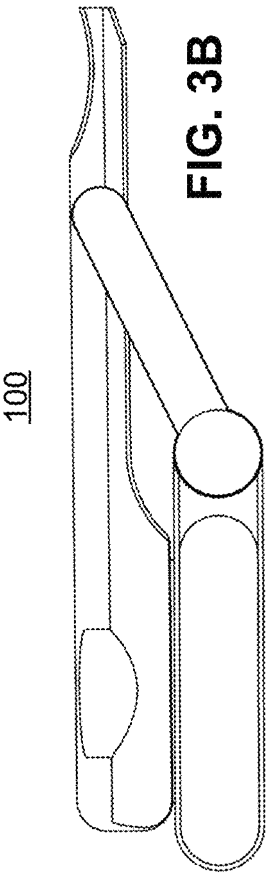
FIG. 3C
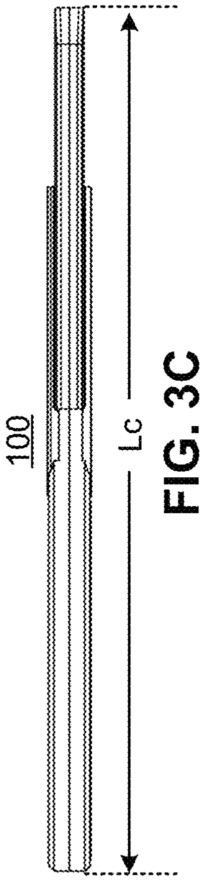
FIG. 3D

SMART STRAIGHT RAZOR

RELATED APPLICATIONS

This application claims the benefit of priority of U.S. Provisional Application Ser. No. 63/519,228 filed Aug. 11, 2023, which is hereby incorporated by reference in its entirety.

FIELD OF THE DISCLOSURE

The present disclosure relates to a smart straight razor. Particularly, the smart straight razor includes motor-driven assemblies coupled to a blade tray assembly that is controlled by a blade controller for safely loading, ejecting, and precisely adjusting exposure and/or tilt of a razor blade.

BACKGROUND

FIG. 1A-FIG. 1C illustrate multiple views of a traditional mechanical straight razor 10, also known as a shavette, which is commonly used in the barber and beauty industry and for in home shaving. In FIG. 1A, the straight razor 10 is shown in its closed position, while in FIG. 1B and FIG. 1C, the mechanical straight razor 10 is shown in its partially opened position. The straight razor 10 may include a handle 10-1 (also known as scales), a wedge pin 10-3, a tail 10-5, a pivot pin 10-7, a tang 10-9, a spine 10-11, a face 10-12, a toe 10-13, an edge 10-15, and a heel 10-17. In some instances, the straight razor 10 may have a fixed blade razor disposed along the edge 10-15 or include a razor holder 10-19 for housing and supporting a disposable razor. The razor holder 10-19 may integrated inside a portion of the face 10-12 and disposed along the edge 10-15, allowing a user to place a disposable double edge razor blade (or a half of a disposable double edge razor blade) into it and manually set or adjust its position. In many instances, this can be a difficult and dangerous process since the user must manually handle and guide the razor into a narrow slot.

Some straight edge razor holders currently on the market are set to a predetermined exposed length. This makes loading and unloading the razor blade easier and, in some instances, safer. However this fixed exposed length limits the blade to a fixed position preventing the user from making any adjustments that may be needed for trimming facial hair of varying lengths. Other razor holders on the market allow the user to load in the razor blade and freely adjust how far out it is exposed. Although this may provide the user more control, it can be more difficult and less accurate to operate and less safe to handle. Overall the user would need to manually place a disposable razor blade into the razor holder and/or adjust how far the razor blade is exposed by hand. This can be tricky and a potentially dangerous for the user since the razor blade and the holder are relatively small tools, making it a tedious task all while handling a razor sharp blade.

Therefore, it would be highly desirable to have an intelligent shaving straight capable of safely, accurately, and intuitively loading and ejecting the disposable razor blades through internal mechanisms, and automatically adjusting the position, angle, and rotation of the disposable razor blade.

SUMMARY

It is an advantage of the present disclosure to provide a smart straight razor that may include a blade enclosure member having internal motor-driven assemblies coupled to a blade tray assembly for receiving a razor blade, a swing arm member coupled to the blade enclosure member, a battery is disposed within the swing arm member, and a blade controller electrically coupled to the motor-driven assemblies for controlling the blade tray assembly, the blade controller is configured to precisely control an exposure depth and/or a tilt of the razor blade.

In one aspect, the blade enclosure member may be coupled to the swing arm member via a pivot joint, and the blade enclosure member or the swing arm member independently rotates about the pivot joint at least 180 degrees, allowing a user to fold the smart straight razor into a compact form when not in use or independently and rotationally adjust the blade enclosure member or the swing arm member to a comfortable and ergonomic shaving position.

In another aspect, the smart straight razor may include a pivot arm member having a first pivot joint and a second pivot joint, the blade enclosure member may be coupled to the pivot arm member at the first pivot joint and the swing arm member may be coupled to the pivot arm member at the second pivot joint.

In yet another aspect, the blade controller may be disposed within the blade enclosure member or the swing arm member. The blade tray assembly may be configured to extend and retract from a blade slot disposed along a portion of the blade enclosure member for loading or unloading the razor blade onto the blade tray assembly. A printed circuit board may be disposed within the blade enclosure member having a control unit and a device driver unit. The control unit may include a microprocessor, memory, and an I/O system which are interconnected by a system bus. The device driver unit may include the blade controller for controlling one or more motors in the motor-driven assemblies, a vibrational motor actuator for actuating a vibrating motor, a sensor hub routing one or more sensors, a haptic feedback controller for controlling an haptic engine, a display driver for driving a display, a wireless transceiver for receiving and transmitting wireless data signals, a human interface device HID controller for managing control inputs received from the razor control buttons, and power management controller for managing and monitoring power levels of the battery.

These and other objects, features and advantages of the present disclosure will become more apparent in light of the following detailed description of preferred embodiments thereof, as illustrated in the accompanying drawings.

BRIEF DESCRIPTION OF THE DRAWINGS

The present disclosure will be more clearly understood from the following detailed description of the preferred embodiments of the disclosure and from the attached drawings, in which:

FIGS. 3A-3G illustrate multiple views of the smart straight razor, including a first side view, a second side view, a bottom view, a top view, a front view, a back view, and a perspective view, respectively, according to an embodiment.

In the appended figures, one or more elements may have the same reference numeral in different figures indicating previously described.

DETAILED DESCRIPTION

Figure 1C:
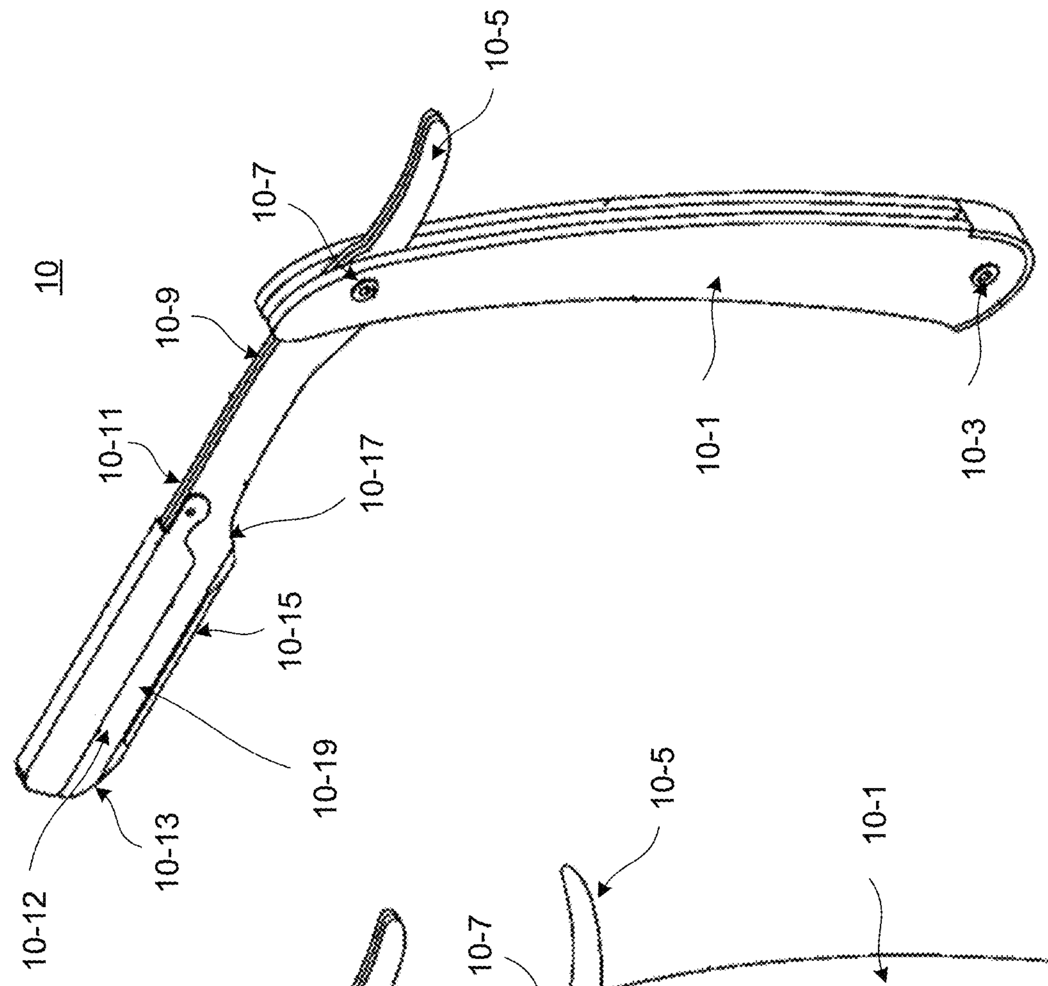
FIGS. 1A-1C illustrate multiple views of a traditional mechanical straight razor, also known as a shavette.
Figure 1A:
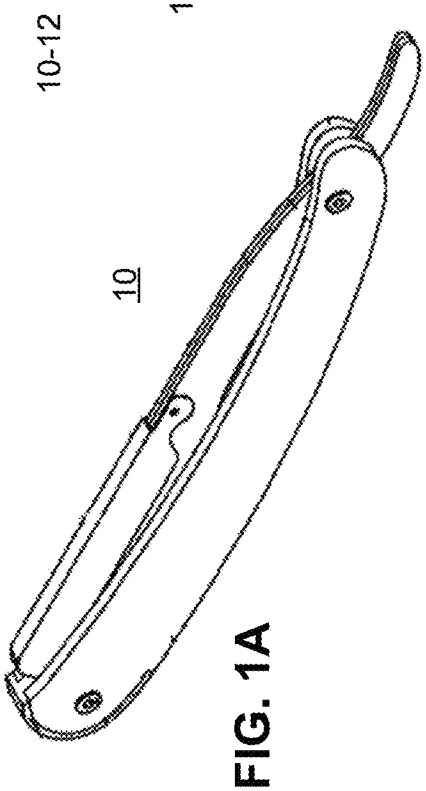
Figure 1B:
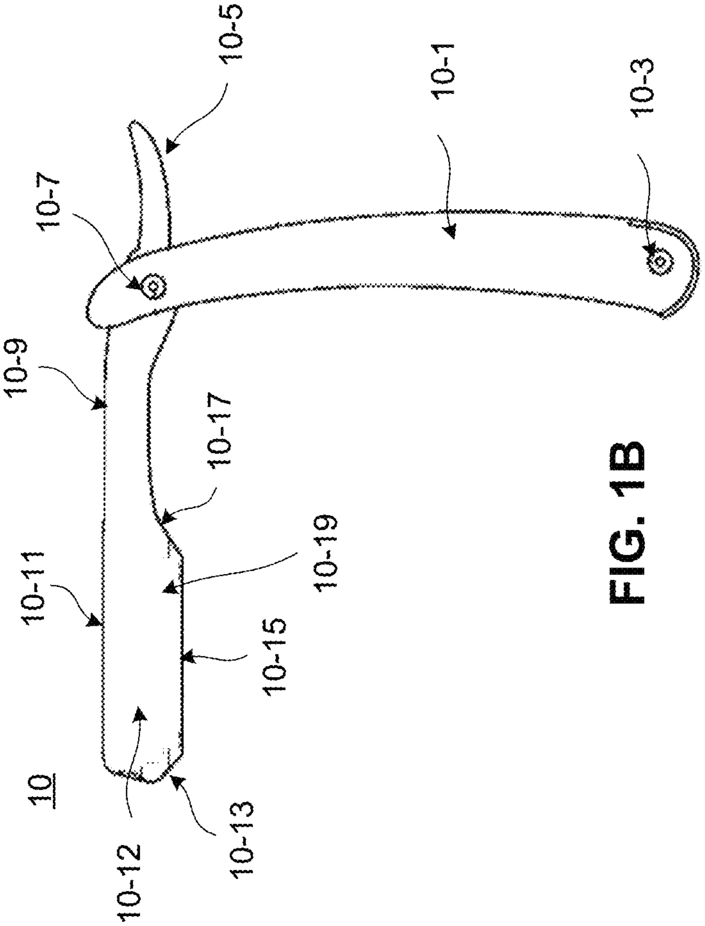
Figure 2:
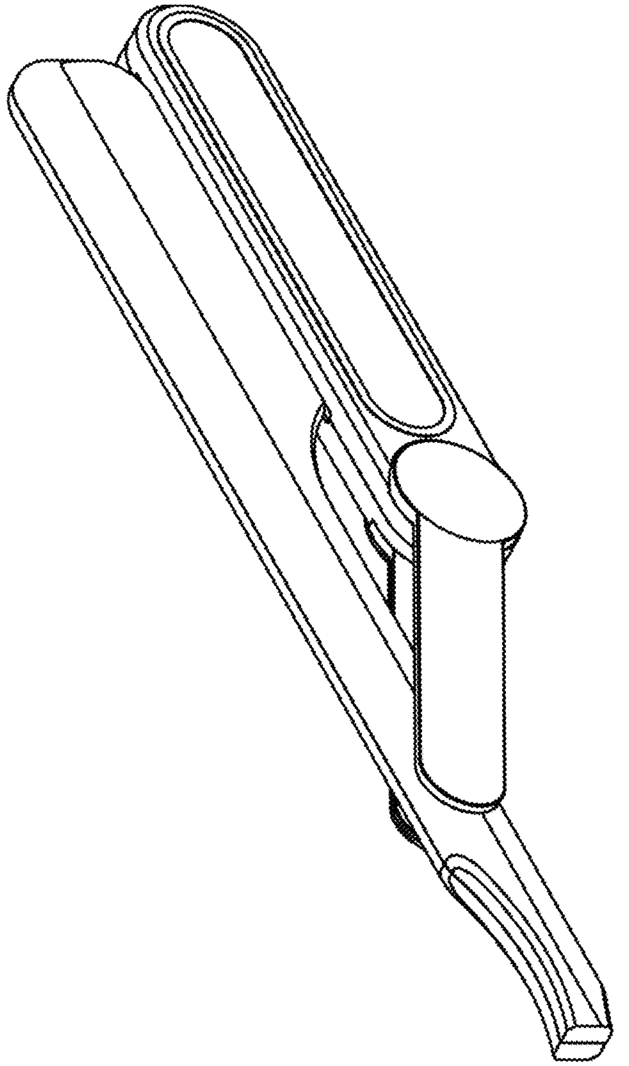
FIG. 2 illustrates a novel smart straight razor in a folded (or closed) position, according to an embodiment.

FIG. 2 illustrates a novel smart straight razor 100 in a folded (or closed) position, according to an embodiment. In one aspect, the smart straight razor 100 is made to appear identical or similar in form, shape, feel, and size to traditional shavettes, allowing users to quickly adapt to it with minimal or no training on its use, functionality, or, handling. In another aspect, the smart straight razor 100 is waterproof having at least an IP67 rating and can be fully submerged in fresh water to a depth of 0.5 m, for 30 minutes, providing users the ability to safely use the straight razor 100 in many shaving environments (i.e., bathroom, sink, and shower).

FIGS. 3A-3G illustrate multiple views of the smart straight razor 100, including a first side view, a second side view, a bottom view, a top view, a front view, a back view, and a perspective view, respectively, according to an embodiment. The straight razor 100 exhibits a sleek and slim design allowing it to be easily stored in medicine cabinets, bathroom drawers, or a user's shirt or pants pocket. Dimensionally, the straight razor 100 may have a closed length (Lc) measuring between 4-6 inches and a thickness (T) measuring between 0.25-0.5 inches. In addition to its slim design, the straight razor 100 is light weight and generally fabricated from a wide range of materials including but not limited to acrylic, (PMMA), acrylonitrile, butadiene, styrene, (ABS), nylon, (polyamide, PA), polycarbonate, (PC), polyethylene, (PE), polyoxymethylene, (POM), polypropylene, (PP), polystyrene, (PS), thermoplastic, elastomer, (TPE), thermoplastic, polyurethane, (TPU), or metal alloys (e.g. stainless steel, aluminum or composite metals) via injection molding techniques or advanced 3D printing techniques.

Figure 4:
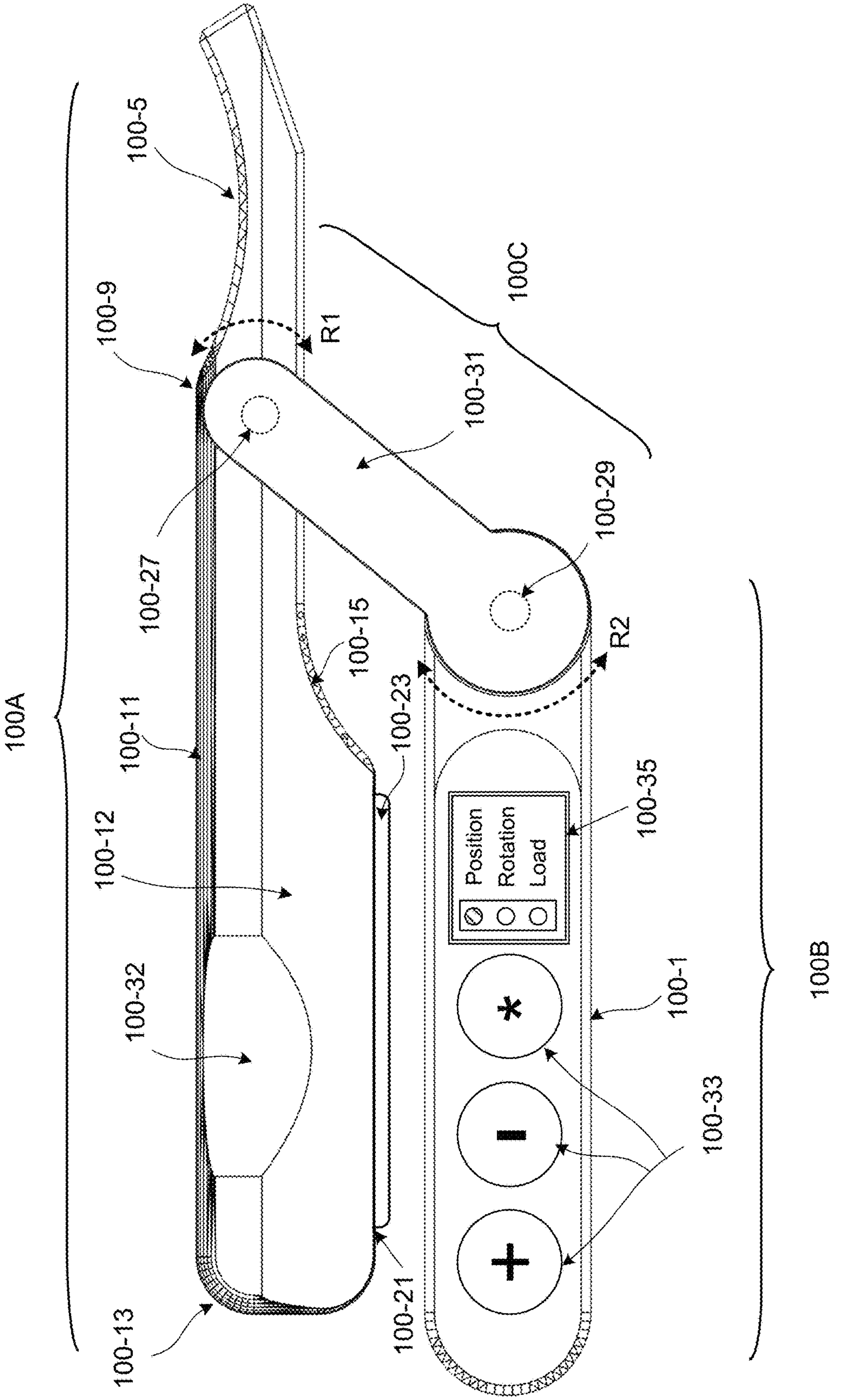
FIG. 4 illustrates external elements of the smart straight razor, according to an embodiment.

FIG. 4 illustrates external elements of the smart straight razor 100, according to an embodiment. The smart straight razor 100 can be sectioned into three parts: 1) a blade enclosure member 100A; 2) a swing arm member 100B; and 3) a pivot coupling member 100C. Some of these external components of the straight razor 100 disposed on the blade enclosure member 100A may share similar elements found on traditional shavettes, including the tail 100-5, the tang 100-9, the spine 100-11, the face 100-12, the toe 100-13, and the heel 100-15. Similarly, the straight razor 100 may also include the handle 100-1 disposed on the swing arm member 100B. Structural components applicable only to the smart straight razor 100 may include a blade slot 100-21 and a disposable razor blade 100-23 disposed along a distal end of the blade enclosure member 100A. The blade slot 100-21 is simply a narrow opening in the blade enclosure member 100A from which the sharp side of the disposable razor blade 100-23 extends and retracts. The straight razor 100 may also include a first pivot joint 100-27 of the pivot coupling member 100C coupled to a portion of the blade enclosure member 100A allowing it to rotate (R1) about the first pivot joint 100-27, a second pivot joint 100-29 of the pivot coupling member 100C coupled to the swing arm member 100B allowing it to rotate (R2) about the second pivot joint 100-29, and a pivot linkage member 100-31 coupling the first pivot joint 100-27 to the second pivot joint 100-29 of the pivot coupling member 100C. Still, other components of the straight razor 100 may include razor control buttons 100-33 integrated within the handle 100-1 of the swing arm member 100B for controlling loading, ejecting, rotating, positioning, and precisely adjusting blade exposure of the disposable razor blade 100-23 in the blade enclosure member 100A. In one non-limiting example, the razor control buttons 100-33 may have a plus button (+) for increasing the blade position/rotation or loading the blade, a minus button (−) for decreasing the blade position/rotation or unloading the blade, and a star button (*) for selecting a mode of operation (position, rotation, and load) for controlling the disposable razor blade 100-23. In another non-limiting example, the control buttons 100-33 may include but is not limited to mechanical switches, electrical switches, tactile buttons, touch screens buttons, capacitor sensors, resistive sensors, inductive sensors, or any other type of sensors. A display 100-35 may be disposed on the swing arm member 100B for providing visual feedback on mode selection, battery level status, notifications, and alerts. In addition, the display 100-35 may employ a variety of display technologies including but not limited to LCD, LED, or touchscreen displays. Furthermore, the smart straight razor 100 may also include a finger support tab 100-32 disposed on both sides of the face 100-12 for rotating the blade enclosure member 100A of the smart straight razor 100 about the first pivot joint 100-27, allowing the user to adjust the smart straight razor 100 to a suitable razor position that provides both comfort and ease of handling to the user and thereby improves their hair shaving experience.

Figure 5:
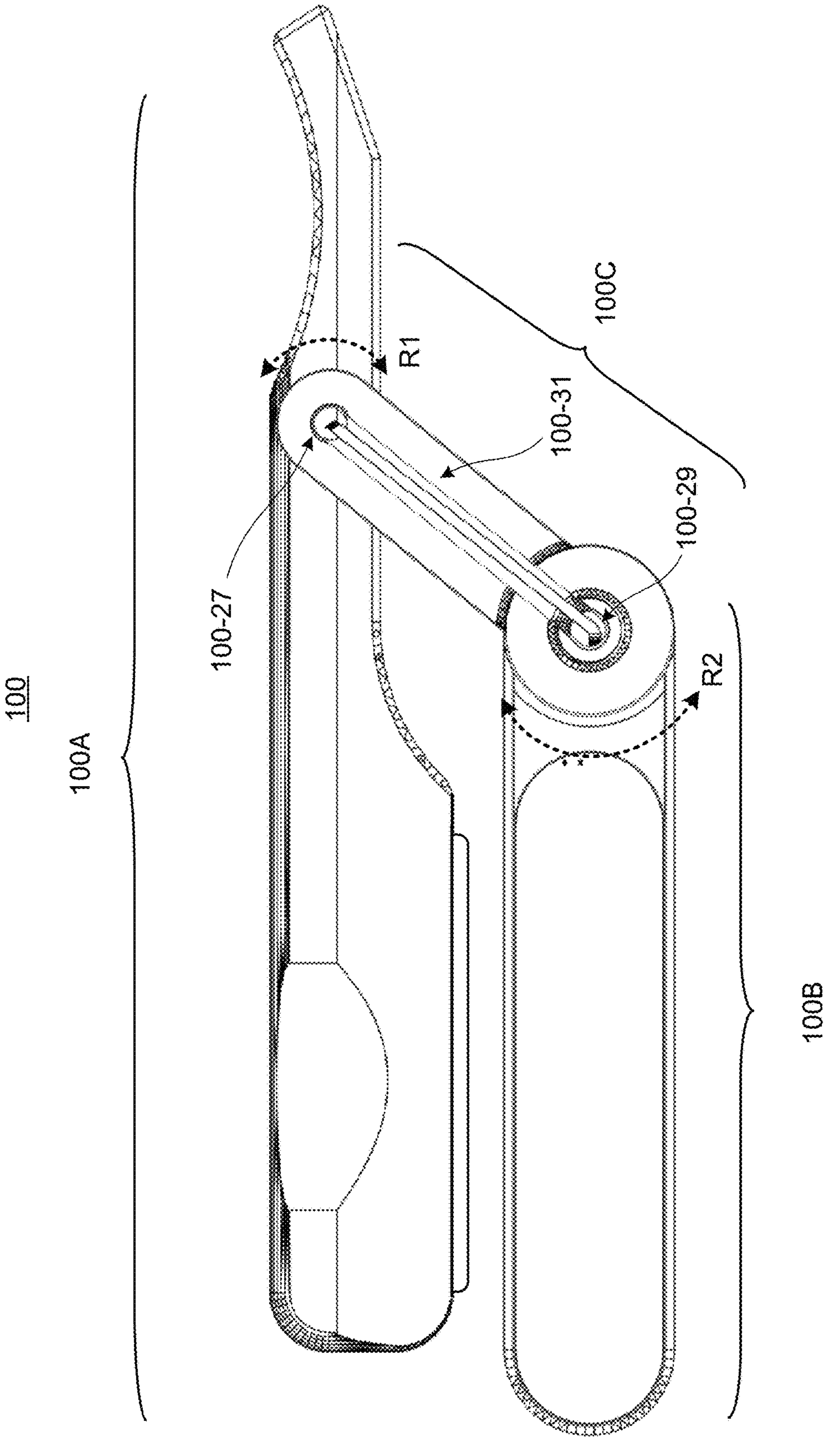
FIG. 5 illustrates a cut-out region of pivot coupling member depicting internal structures of the first pivot joint, the second pivot joint, and the pivot linkage member, according to an embodiment.

FIG. 5 illustrates a cut-out region of pivot coupling member 100C depicting internal structures of the first pivot joint 100-27, the second pivot joint 100-29, and the pivot linkage member 100-31, according to an embodiment. The blade enclosure member 100A and the swing arm member 100B are coupled to the pivot coupling member 100C via the two pivot joints (100-27, 100-29). The pivot linkage member 100-31 generally has a rigid and planar body that transmits and transforms motion and position of the blade enclosure member 100A and the swing arm member 100B via to the two pivot joints (100-27, 100-29), allowing a variety of mechanical movements and rotational positions of these members (100A, 100B). For example, each member (100A, 100B may independently rotate about their respective pivot joint (100-27, 100-29) at least 180 degrees, allowing the user to fold the smart straight razor 100 into a compact form when not in use or independently and rotationally adjust the blade enclosure member 100A and/or the swing arm member 100B to a comfortable and ergonomic shaving position. Non-limiting examples of pivot joints may include pin joints, pivot hinges, rotating swivel plates, or rotating bearing assemblies.

Figure 6:
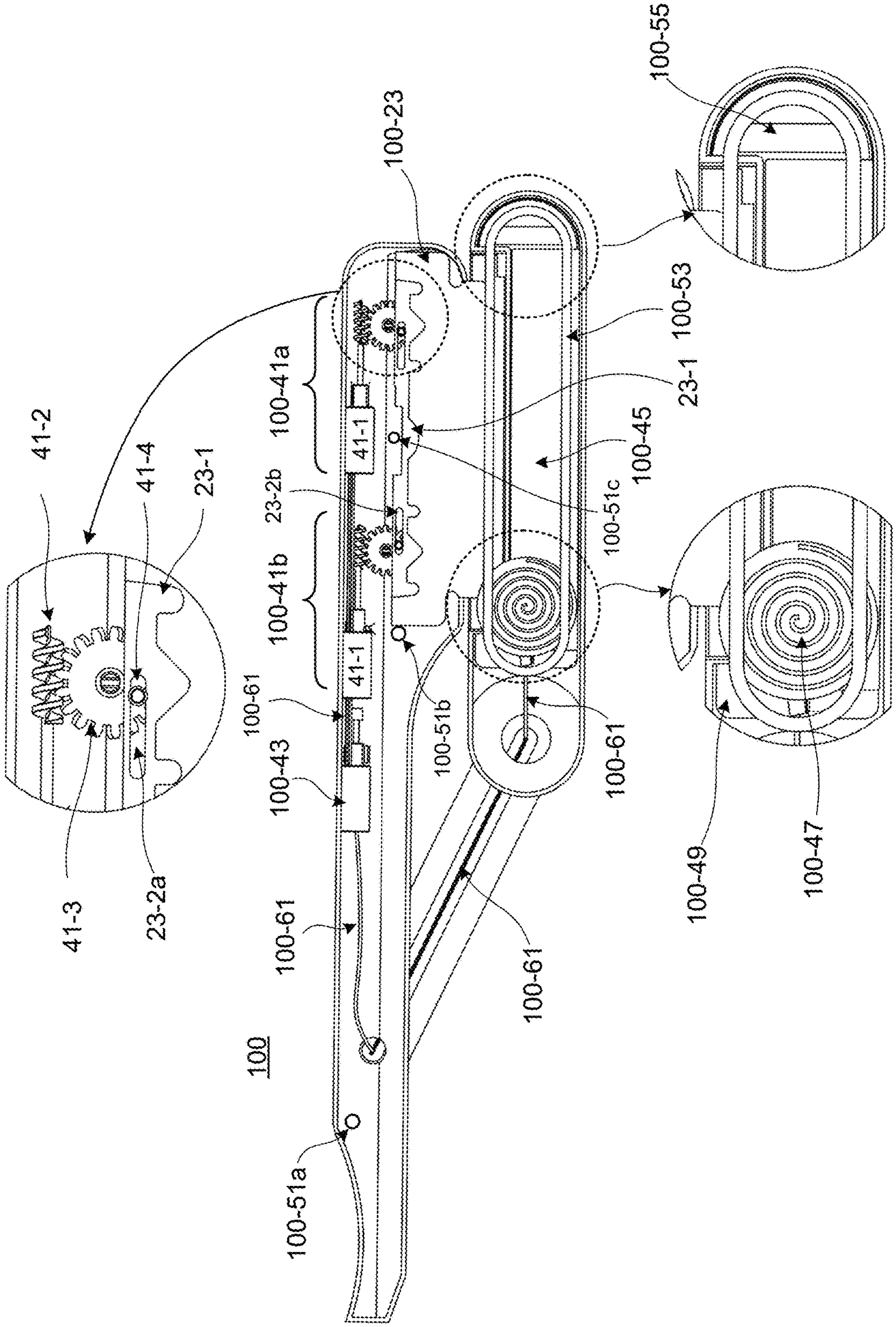
FIG. 6 illustrates side cut-out view of internal components of the smart straight razor, according to an embodiment.

FIG. 6 illustrates side cut-out view of internal components of the smart straight razor 100, according to an embodiment. In one non-limiting example, internal components of the blade enclosure member 100A may include two independently controlled motor-driven assemblies. Examples of motor-driven assemblies may include, but are not limited to worm gear assemblies (100-41*a*, 100-41*b*). In particular, each worm gear assembly may have a motor 41-1, a threaded worm shaft 41-2 coupled to the motor 41-1, and a worm wheel 41-3 having a blade pin 41-4 for controlling a blade tray assembly 23-1 housing the disposable razor blade 100-23 when inserted therein. In addition, the blade pin 41-4 of each worm gear assembly (100-41*a*, 100-41*b*) is slidably coupled to a blade pin slot (23-2*a*, 23-2*b*) of the blade tray assembly 23-1. In operation, when one or both motors 41-1 of the worm gear assemblies (100-41*a*, 100-41*b*) are actuated, the worm wheel 41-3 rotates against threaded worm shaft 41-2 causing the blade pin 41-4 to slide within the blade pin slot (23-2*a*, 23-2*b*) and then vertically lift or lower the blade tray assembly 23-1, thereby mechanically controlling the precise position, rotation, panning, tilting, and load operations of the disposable razor blade 100-23 that is inserted into the blade tray assembly 23-1. The worm wheel moves due to the threaded worm shaft's rotation having a unidirectional motion. The threaded worm shaft 41-2 can drive the worm wheel 41-3 (the gear), but the worm wheel 41-3 cannot drive the worm shaft 41-2, ensuring that once the blade tray is in its set position, it cannot move unless the motors are actuated by the controls. In another implementation, a top section of the blade tray assembly 23-1 may have multiple extrusions, curves, and cutouts that can be used for aligning and mating with the shape of the disposable razor blade 100-23 when inserted therein, ensuring that razor blade is always aligned correctly onto the tray of the blade tray assembly 23-1. A further discussion of the blade tray assembly 23-1 and features are presented later in this document. The straight razor 100 may also include other motor assemblies such as a vibrating motor 100-43 for generating a vibrational or a tactile feedback to the user in response to predefined events (e.g., low battery, blade exposures maximum or minimum limits exceeded, ON/OFF states, etc.) or touch input selection. The vibrational motor 100-43 may also be implemented to create ultrasonic vibrations that can improve the shaving experience, allowing the disposable razor blade 100-23 to cut more easily. In another aspect, power to the smart straight razor 100 is supplied by a battery 100-45 which may be disposed within the member 100B. The battery 100-45 may be recharged via direct or indirect charging methods. For direct charging methods, the battery 100-45 may be coupled to a power regulator and charge controller unit receiving power from a power source (e.g., AC or DC outlet) over a cable or plug. For indirect charging methods, such as in wireless charging or inductive charging, a wireless charging coil 100-47 is employed to recharge the battery 100-45 via an inductive charging pad or charging station connected to the power source. In another aspect, there may be one or more sensors (100-51*a*, 100-51*b*, 100-51*c*) disposed on or within different parts of the smart straight razor 100. Some non-limiting examples of these sensors may include but are not limited to tactile sensors, optical sensors, power sensors, heat detectors, mechanical position sensors, blade position sensors, environmental sensors, or any type of sensors or detectors capable of measuring physical or electrical properties in the smart straight razor 100. Operationally, the one or more sensors (100-51*a*, 100-51*b*, 100-51*c*) may 1) optically detect and identify razor blade type that is loaded which has the mark of approval etched, printed, implanted, stuck onto, or as a cut out; 2) electrically, mechanically, or optically measure precise location and position of where the razor blade is exposed; 3) electrically measure battery level; 4) electrically, mechanically, or optically sense if user's hand is applied to the handle; and/or 5) electrically, mechanically, or optically measure or identify an action or event that is applied to or emanating from the smart straight razor 100. In yet another embodiment, electrical components of the smart straight razor 100 include, for example, a printed circuit board (PCB) 100-49 having at least a microprocessor, memory, I/O bus, a wireless transceiver, and power management for processing and handling user actions or events that are applied to or emanating from the smart straight razor 100. Many functional aspects of the PCB 100-49 are presented later in this document.

Other internal components of the smart straight razor 100 may include an LED light strip 100-53 and a haptic engine 100-55 disposed on the swing arm member 100B for providing practical illumination and enhancing both the appearance and tactile feedback on the handle 100-1. A data and power cable 100-61 connects the PCB 100-49, the battery 100-45, and motors 41-1 of the worm gear assemblies (100-41*a*, 100-41*b*), and other integrated electrical components, providing power to all electrical components while simultaneously communicating data to the microprocessor of the PCB 100-49. Some non-limiting examples of the data and power cable 100-61 include wired harness bundles, Flat Flexible Cable (FFC), and Flat Printed Circuit (FPC) connectors.

Figure 7:
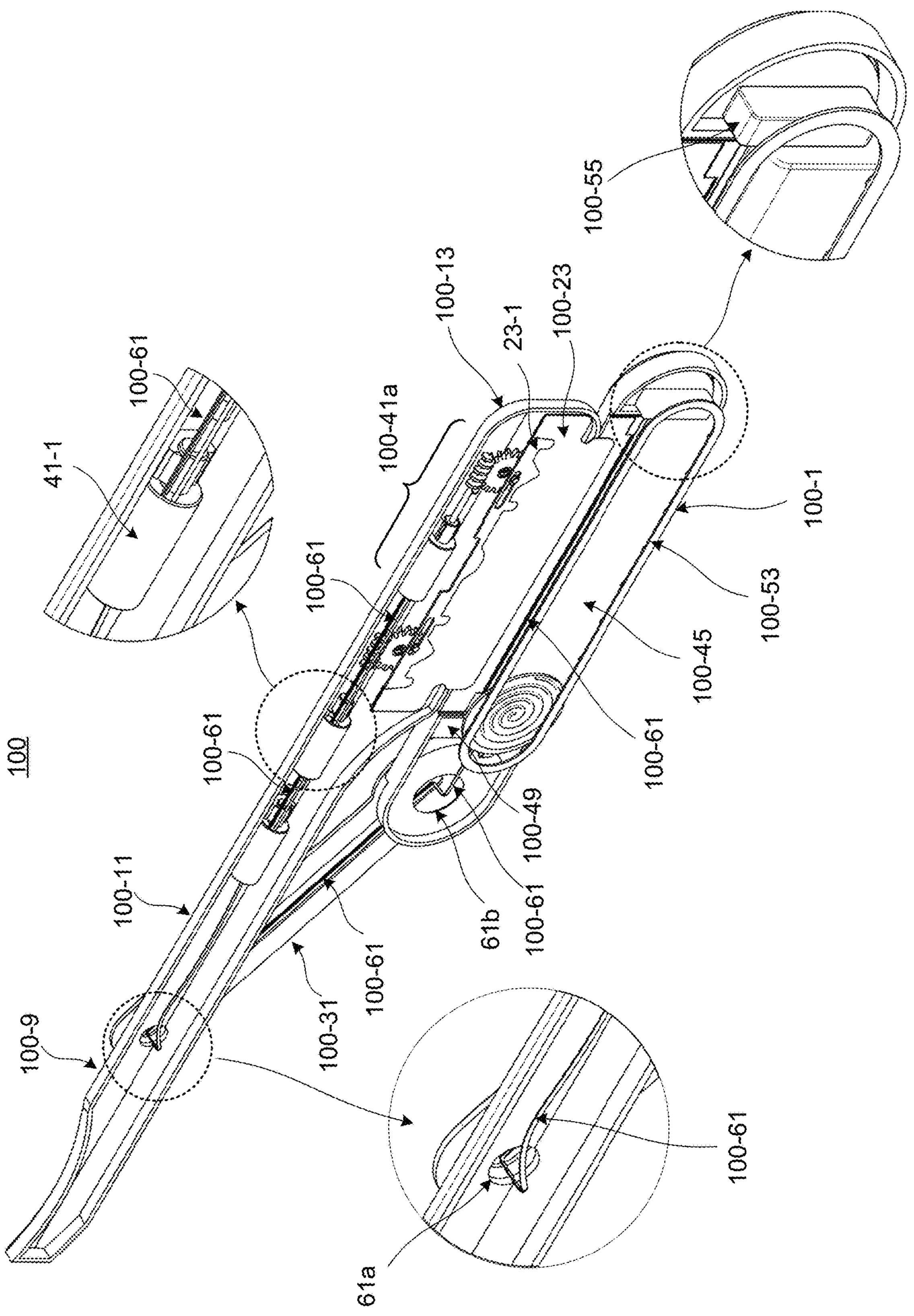
FIG. 7 illustrates perspective cut-out view of novel internal components of the smart straight razor, according to an embodiment.

FIG. 7 illustrates perspective cut-out view of novel internal components of the smart straight razor 100, according to an embodiment. Internal components of the smart straight razor 100 are further illustrated in the perspective cut-out view. In particular, a first routing path of the data and power cable 100-61 connecting the PCB 100-49 to various components starts from the first worm gear assemblies (100-41*a*) running along the spine 100-11 and then through a first wire hole 61*a*, continuing along an inner section of the pivot linkage member 100-31, passing through second wire hole 61*b*, and then connecting to the PCB 100-49. A second routing path of the data and power cable 100-61 connecting the PCB 100-49 includes the wire 100-61 running and extending along an inner edge portion of the handle 100-1 and then connecting to the battery 100-45, the LED light strip 100-53, and the haptic engine 100-55.

Figure 8A:
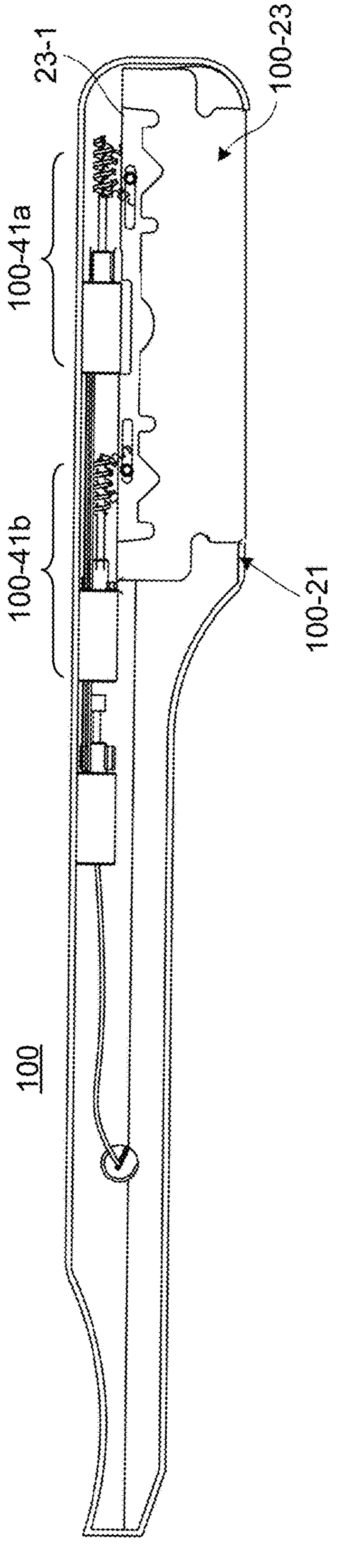
FIGS. 8A-8D illustrate side cut-out views of the smart straight razor with the disposable razor blade exposure and tilt positions, according to an embodiment.
Figure 8B:
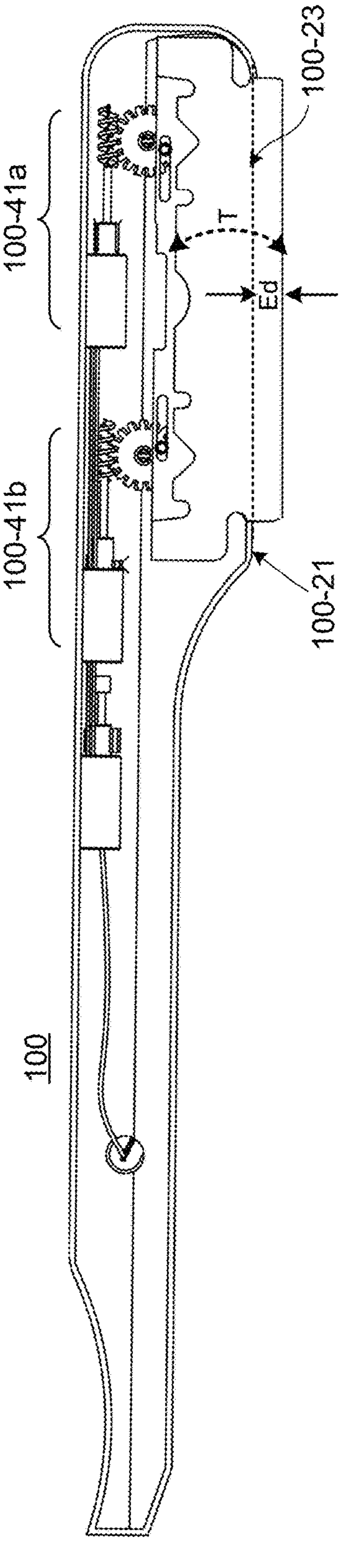
Figure 8D:
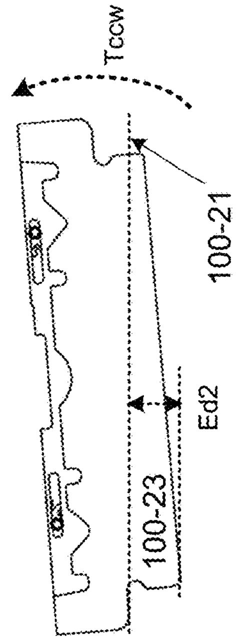
Figure 8C:
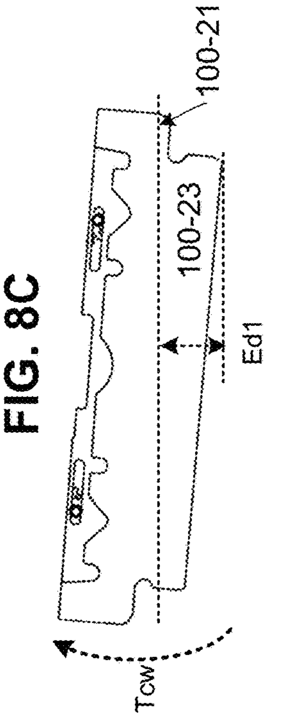

FIG. 8A-FIG. 8D illustrate side cut-out views of the smart straight razor 100 with the disposable razor blade 100-23 exposure and tilt positions, according to an embodiment. In one aspect, the user may adjust the disposable razor blade 100-23 using the razor control buttons 100-33 to control both the exposure depth (Ed) and tilt (T) of the razor blade 100-23 extending out of the blade slot 100-21. In operation, the user may select a desired blade setting using the razor control buttons 100-33 which, in response, transmits a signal to the PCB 100-49 to execute and send a command signal to the worm gear assemblies (100-41*a*, 100-41*b*) for driving and actuating the motors 41-1 thereof, causing the threaded worm shaft 41-2 to rotate clockwise (CW) or counter-clockwise (CCW) which in turn causes the worm wheel 41-3 to rotate in a likewise manner against the threaded worm shaft 41-2. In response to the rotating worm wheel 41-3, the blade pin 41-4 may slide back and forth within the blade pin slot (23-2*a*, 23-2*b*) causing the blade tray assembly 23-1 to vertically rise or lower depending on the rotational direction of the rotating worm wheel 41-3 in each worm gear assemblies (100-41*a*, 100-41*b*). In particular, each worm gear assemblies (100-41*a*, 100-41*b*) are configured rotate simultaneously in the same rotational direction (i.e., CC or CCW), simultaneously with different rotational directions, rotate independently from one another in the same rotational direction, or rotate independently from one another with different rotational direction, causing the blade tray assembly 23-1 to lift, lower, pan, or tilt in a precise manner. In FIG. 8A, for example, the blade tray assembly 23-1 is shown in its fully retracted and un-rotated position with the razor blade 100-23 fully contained within the blade slot 100-21, allowing the user to safely handle, carry, or store the smart straight razor 100. In FIG. 8B, the blade tray assembly 23-1 is shown in its partially exposed and un-rotated position with the razor blade 100-23 partially extended at a precise exposure depth (Ed) from the blade slot 100-21. In FIG. 8C, the blade tray assembly 23-1 is slightly tilted in clockwise (Tcw) direction partially exposing and extending the razor blade 100-23 from the blade slot 100-21 at a precise exposure depth (Ed1). In FIG. 8D, the blade tray assembly 23-1 is slightly tilted in counter-clockwise direction (Tccw) partially exposing and extending the razor blade 100-23 from the blade slot 100-21 at a precise exposure depth (Ed2). Other types of actuators for controlling the blade tray assembly 23-1 include but are not limited to spur gears, helical gears, gear racks, bevel gears, miter gears, screw gears, internal gears, chain driven components, belt driven parts, tracks, pistons, magnetic driven motors, or other types of motorized assemblies for converting the speed and direction of motion.

Figure 9A:
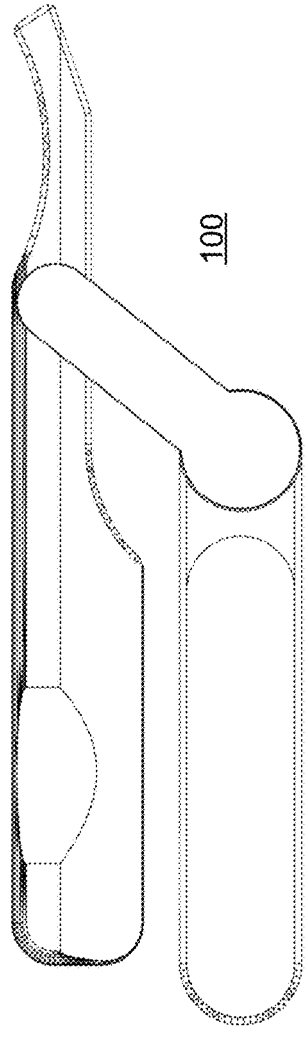
FIGS. 9A-9B illustrate the smart straight razor in a fully retracted and folded position and a typical unfolded shaving position, according to an embodiment.
Figure 9B:
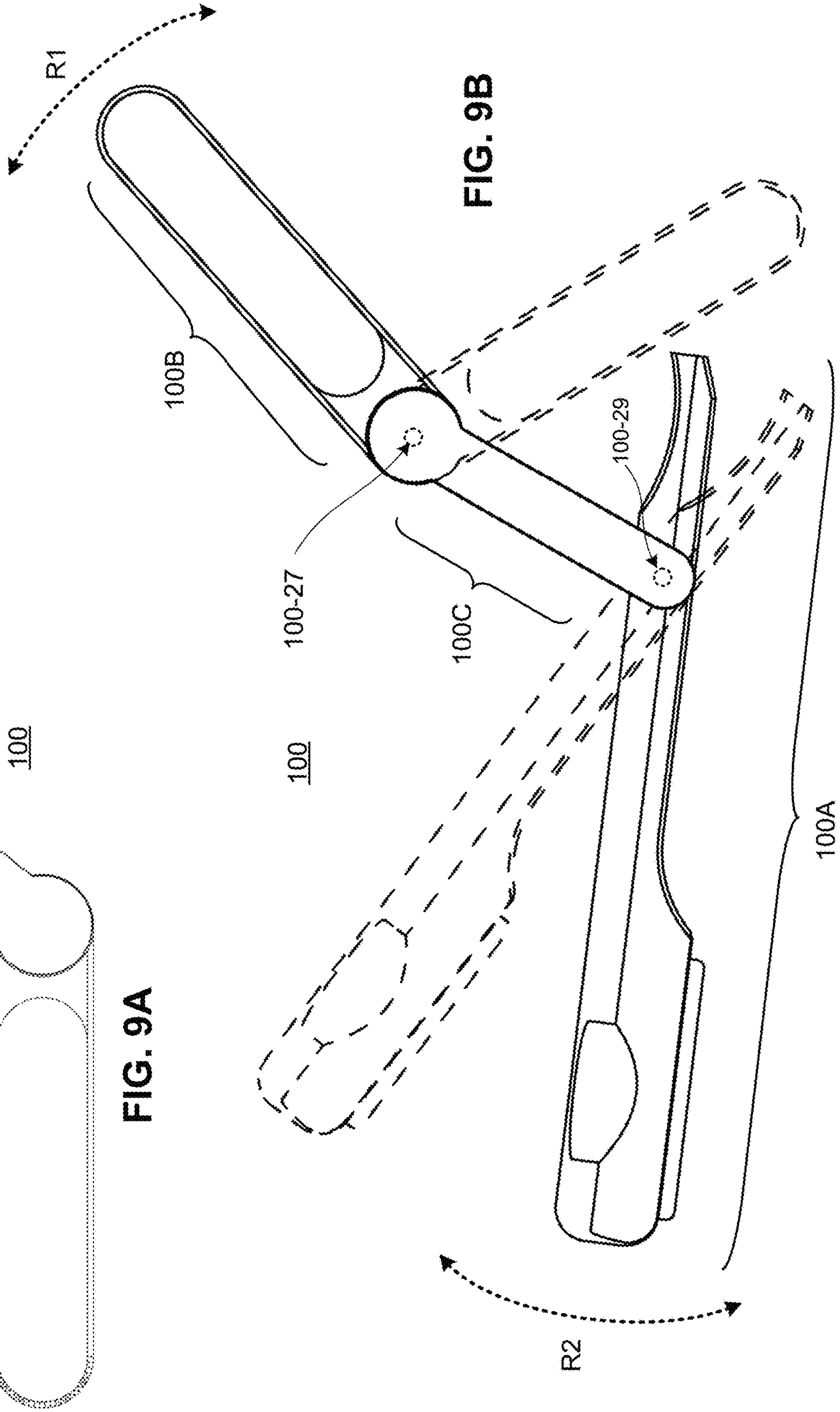

FIGS. 9A-9B illustrate the smart straight razor 100 in a fully retracted and folded position (FIG. 9A) and a typical unfolded shaving position (FIG. 9B), according to an embodiment. In one instance, the smart straight razor 100 is kept in its fully retracted and folded position for compact storage, safe-keeping, or travel purposes, allowing the user to safely store and easily carry the straight razor 100 in small spaces (e.g., pockets, grooming bag, backpack, etc.) while preventing injuries from the razor blade 100-23. In the unfolded shaving position depicted in FIG. 9B, each member (100A, 100B may be independently rotated about their respective pivot joint (100-27, 100-29) at least 180 degrees, allowing the user to independently and rotationally adjust the blade enclosure member 100A and/or the swing arm member 100B to a comfortable and ergonomic shaving position. Likewise, the user may independently and rotationally adjust the blade enclosure member 100A and/or the swing arm member 100B to the fold it back into a compact form when not in use as shown in FIG. 9A.

Figure 10:
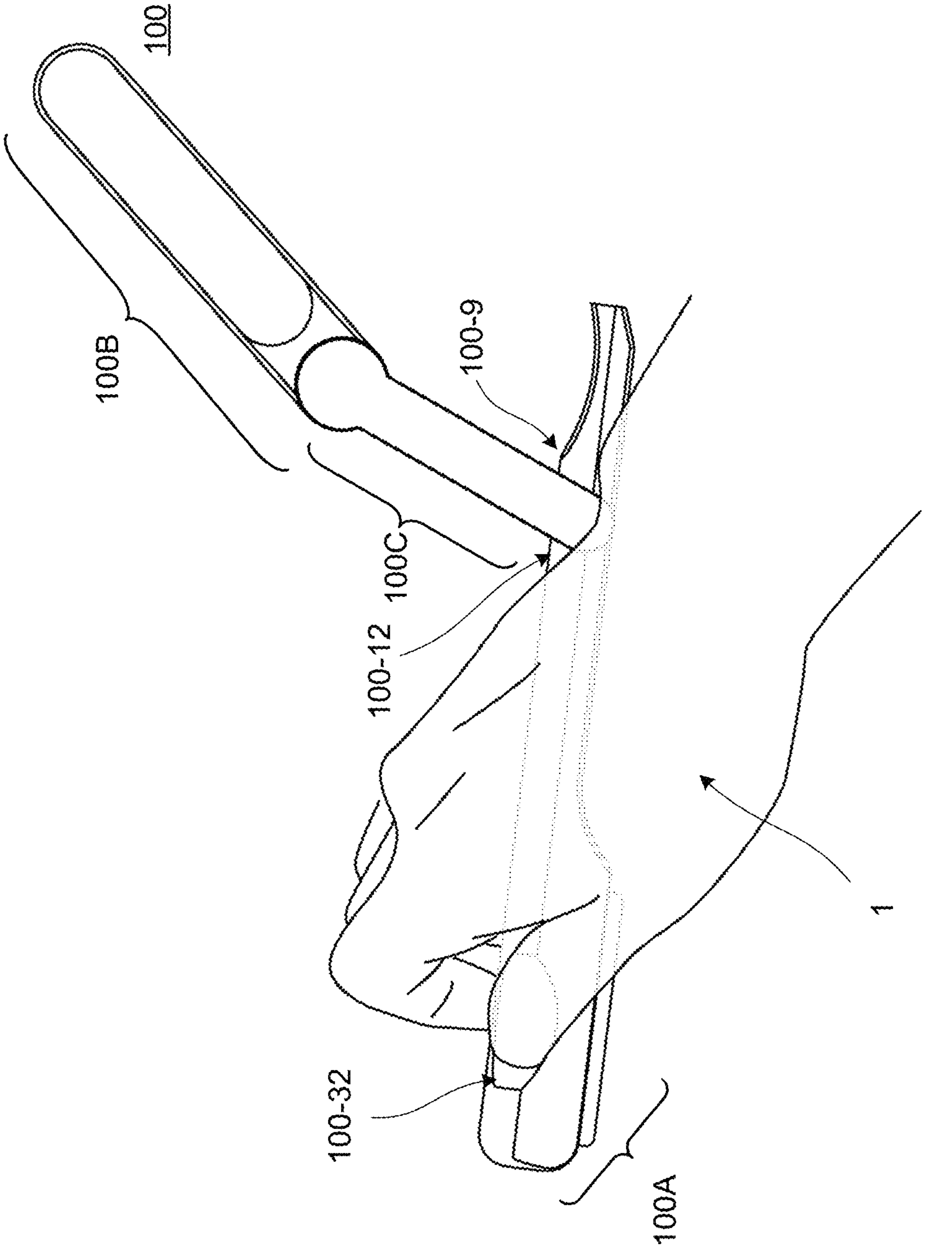
FIG. 10 illustrates a typical method of operating and handling the smart straight razor, according to an embodiment.

FIG. 10 illustrates a typical method of operating and handling the smart straight razor 100, according to an embodiment. Prior to using the smart straight razor 100, the user may unfold it from its compact and folded state (as shown in FIG. 9A) to a comfortable and ergonomic shaving position (as shown in FIG. 9B) by independently and rotationally adjusting the blade enclosure member 100A and/or the swing arm member 100B as described hereinabove. Next, to hold and properly handle the straight razor 100, the user may pinch the finger support tab 100-32 with the index finger and thumb of their hand 1, resting the side of their hand 1 against the face 100-12 near the tang 100-9 and pressing their remaining fingers against the opposing face 100-12 side of the straight razor 100.

Figure 11:
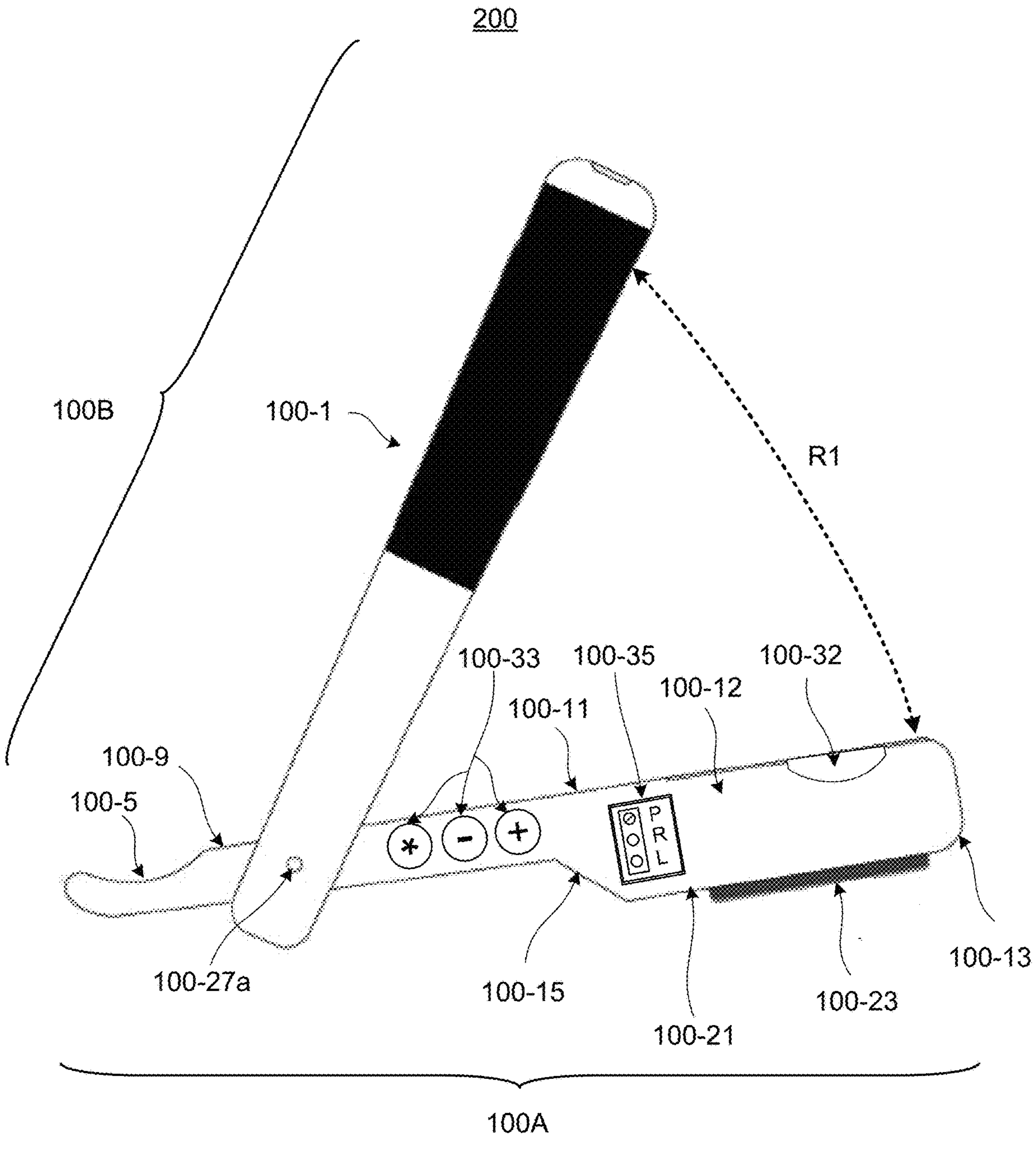
FIG. 11 illustrates an alternate configuration of a smart straight razor, according to an embodiment.

FIG. 11 illustrates an alternate device configuration of a smart straight razor 200, according to an embodiment. In this alternate configuration, the smart straight razor 200 includes the blade enclosure member 100A which is coupled to the swing arm member 100B via a single pivot member 100-27*a*. With the exception of the pivot coupling member 100C, the internal and external mechanical and electrical components of the smart straight razor 200 are identical to the previous straight razor 100 embodiment, as described hereinabove. Notably, the placement of the razor control buttons 100-33 and/or the display 100-35 are not limited to being disposed on the handle 100-1 of the controller member 100B but may be placed on the blade enclosure member 100A itself as shown in the alternate device configuration of FIG. 11.

Figure 12:
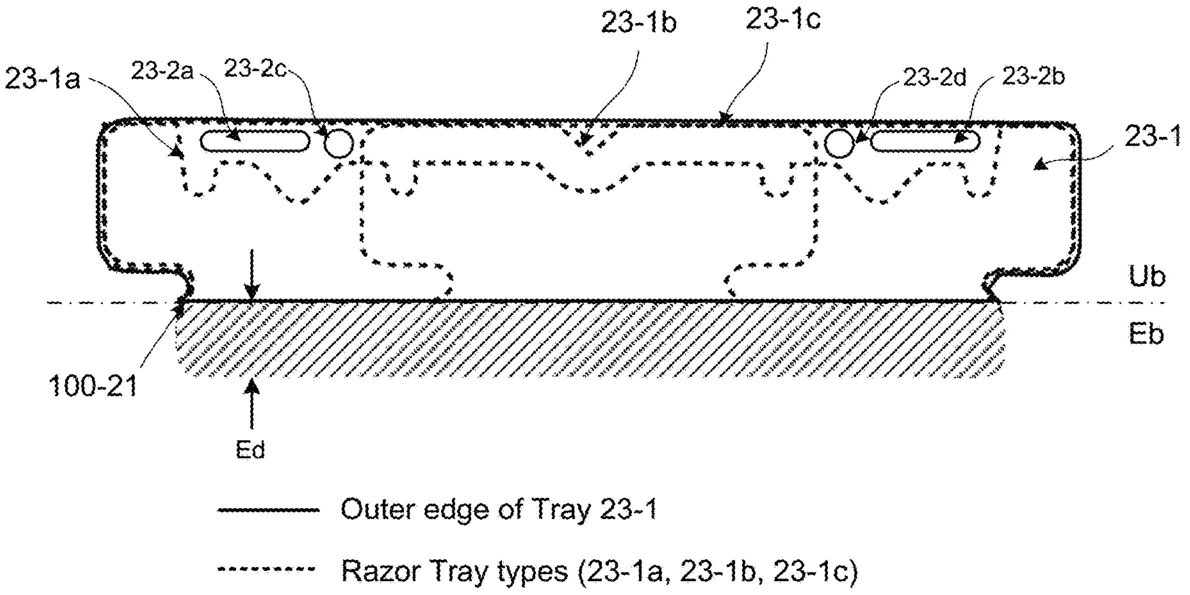
FIG. 12 illustrates the blade tray assembly of the smart straight razor, according to an embodiment.
Figure 13A:
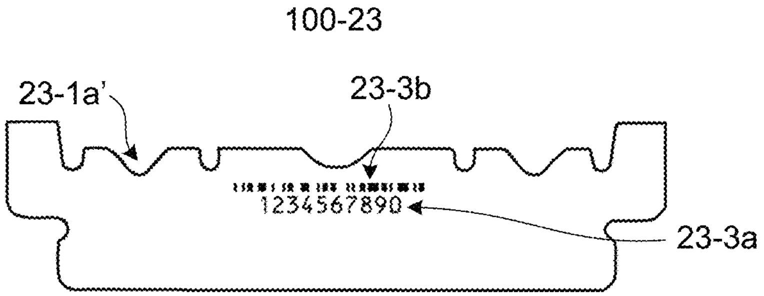
FIGS. 13A-13D illustrate different types of disposable razor blade that are adapted to fit onto the blade tray assembly of the smart straight razor, according to an embodiment.
Figure 13B:
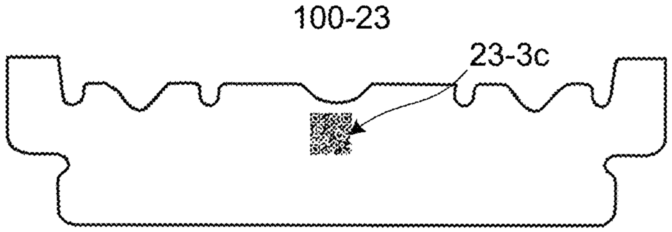
Figure 13C:
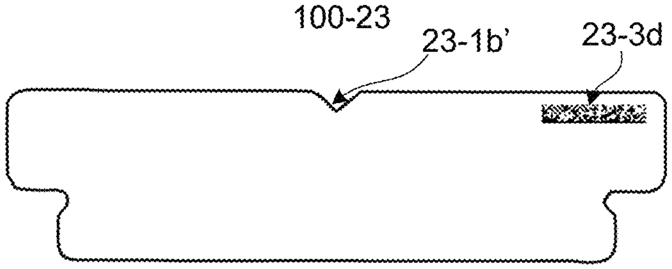
Figure 13D:
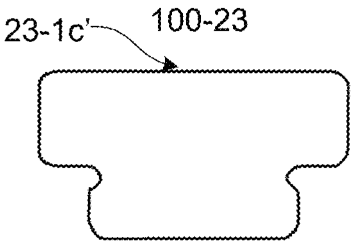

FIG. 12 illustrates the blade tray assembly 23-1 of the smart straight razor 100 or 200, according to an embodiment. In one example, the blade tray assembly 23-1 may include the two blade pin slots (23-2*a*, 23-2*b*) disposed along a top portion thereof and a planar body having a recessed keyed adapter that is structured to complementary match (similar to a key-hole configuration) and mate with razor blades of various shapes and sizes disposed on a top portion of the razors, including but not limited to a keyed tray having cut-outs or grooves 23-1*a*, a notch 23-1*b*, or a straight edge 23-1*c* as shown in FIG. 12. When the razor blade inserted into the blade tray assembly 23-1, an upper portion (Ub) of the razor blade is seated in the keyed tray of the blade tray assembly 23-1, while a cutting or sharp edge portion (Eb) of the razor blade extends outside of the keyed tray. In other embodiments, the keyed adapter may include but is not limited to any shallow or partially recessed slot having the same shape as the inserted razor. Advantageously, the tray of the blade tray assembly 23-1 may allow the user to safely load the disposable razor blade via a digitally controlled feed actuated by the user via the razor control buttons 100-33. This loading action is analogous to (but not limited to) to how a CD player would load and eject a CD media. The gears and actuators of the worm gear assemblies (100-41*a*, 100-41*b*) allow for precise movement and adjustment of the disposable razor blade 100-23, ensuring safe handling of the sharp object. In operation, the user is only required to load the disposable razor blade 100-23 is onto the blade tray assembly 23-1. In another embodiment, the blade tray assembly 23-1 may include one or more razor fasteners (23-2*c*, 23-2*d*) disposed along a top portion of the blade tray assembly 23-1 for securing the disposable razor blade in place so that it does not fall out. Non-limiting examples of the one or more razor fasteners (23-2*c*, 23-2*d*) include but are not limited to magnets, springs, or clips that push against and secure the disposable razor blade in place.

FIGS. 13A-13D illustrate different types of disposable razor blade 100-23 that are adapted to fit onto the blade tray assembly 23-1 of the smart straight razor 100 or 200, according to an embodiment. In one example, the razor blades of various shapes and sizes disposed on a top portion of the razors, including but not limited to razors with cut-outs or grooves 23-1*a*', complementary matching and fitting into the tray having grooves 23-1*a* of the blade tray assembly 23-1. Likewise notch 23-1*b*' complementary match and fit into the notch 23-1*b* while the straight edges 23-1*c*' complementary match and fit into the straight edges 23-1*c* of the blade tray assembly 23-1 as in a key-hole pair. In yet another implementation, the disposable razor blade 100-23 may have etched, printed, implanted, or taped markings disposed on a top portion of the razor blade for that are read by the optical sensor 100-51*c* to identify a razor blade type when loaded in the blade tray assembly 23-1. These markings may include but are not limited to alpha-numeric characters 23-3*a*, barcodes 23-3*b*, QR Code 23-3*c*, or any other type of striped codes 23-3*d*, storing digitally encoded specification and product information about the razor blade (e.g., part number, product type, website, product size, etc.).

Figure 14:
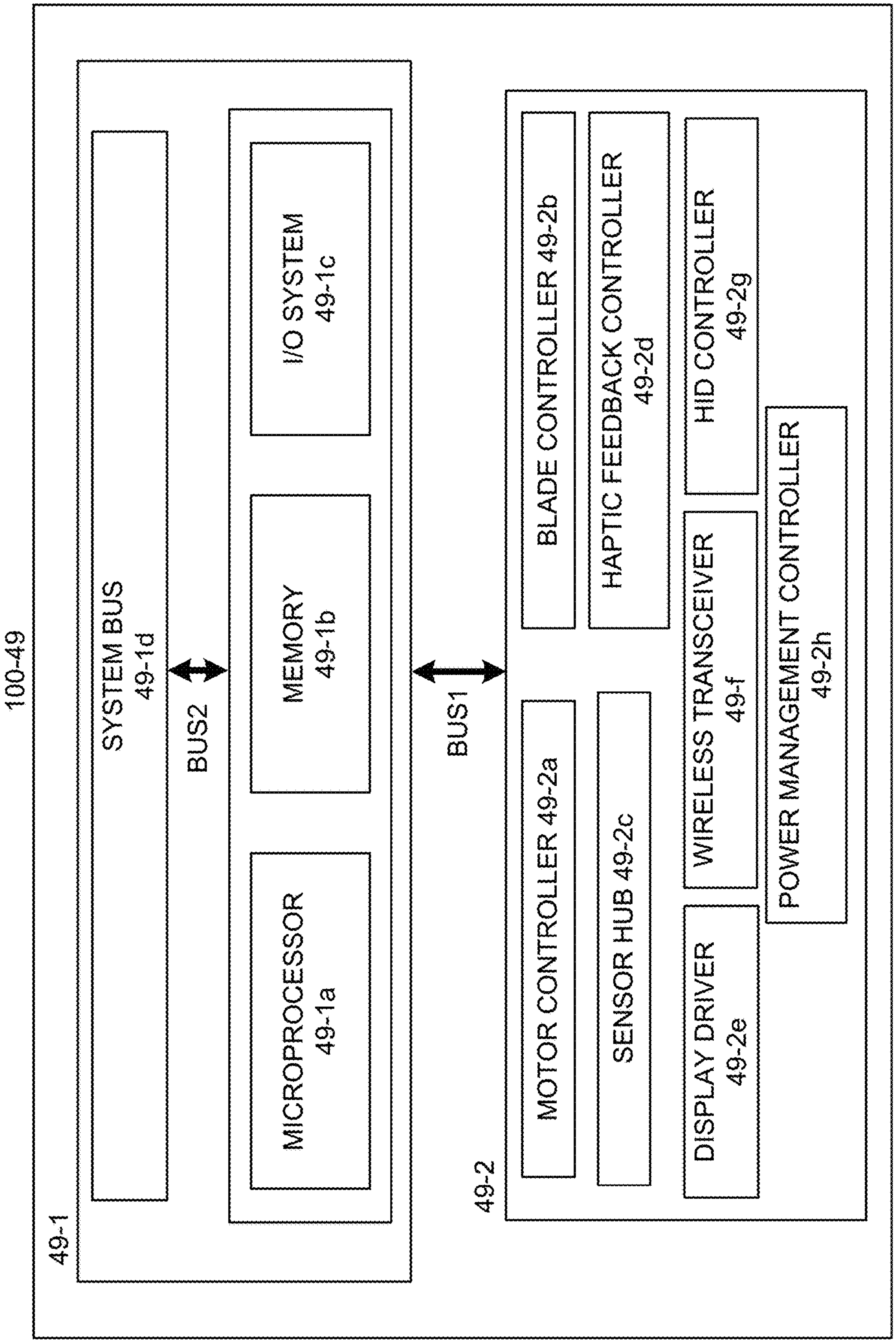
FIG. 14 illustrates a block diagram of components of the printed circuit board (PCB), according to an embodiment.

FIG. 14 illustrates a block diagram of components of the printed circuit board (PCB) 100-49, according to an embodiment. The printed circuit board (PCB) 100-49 having a control unit 49-1 and a device driver unit 49-2 communicating data over a first bus line (BUS1). The control unit 49-1 may include a microprocessor 49-1*a*, memory 49-1*b*, and an I/O system 49-1*c* which are interconnected to a system bus 49-1*d* via a second bus line (BUS2), determining one or more response parameters based on a set of input data it receives from the data block 49-2. The device driver unit 49-2 may include a vibrational motor actuator 49-2*a* for actuating the vibrating motor 100-43, a blade controller 49-2*b* for controlling motors 41-1 of the worm gear assemblies (100-41*a*, 100-41*b*), a sensor hub 49-2*c* routing the one or more sensors (100-51*a*, 100-51*b*, 100-51*c*), a haptic feedback controller 49-2*d* for controlling the haptic engine 100-55, a display driver 49-2*e* for driving the display 100-35, a wireless transceiver 49-2*f* for receiving and transmitting wireless data signals, a human interface device HID controller 49-2*g* for managing control inputs received from the razor control buttons 100-33, and power management controller 49-2*h* for managing and monitoring power levels of the battery 100-45 via the power sensor and relaying battery power levels data back to the control unit 49-1. In one aspect, the control unit 49-1 receives an input from the device driver unit 49-2 in the form of a data signal, formulating one or more commands (via the microprocessor 49-1*a*) based on the input it received from the device driver unit 49-2, and then transmitting the one or more commands to the device driver unit 49-2 for execution based on the received input. For example, the control unit 49-1 may receive inputs from the sensor hub 49-2*c* or selected inputs from the razor control buttons 100-33 for controlling modes of operation of the smart straight razor (100 or 200). In another aspect, the control unit 49-1 may receive inputs from an external host device (e.g., smartphone, mobile computer, tablet) via the wireless transceiver for controlling operational modes or providing software updates for enhancing or expanding operational features of the smart straight razor 100 or 200). For example, users can download an app or program using their smart phone or computer to update the firmware and other customization features.

Some non-limiting examples of programming instructions performed and executed by the microprocessor 49-1*a* of the PCB 100-49 may include, but are not limited to: 1) determining and transmitting blade position to the motors 41-1 worm gear assemblies (100-41*a*, 100-41*b*) to adjust the exposure (or stick-out) of the disposable razor blade 100-23; 2) determining and transmitting a first blade position to the motor 41-1 of the first worm gear assembly (100-41*a*) while simultaneously determining and transmitting a second blade position to the motor 41-1 of the second worm gear assembly (100-41*b*) to adjust the rotation of the disposable razor blade 100-23; and 3) determining and transmitting an actuation flag to the vibrating motor 100-43 causing it to vibrate in response to a low battery event. In another aspect, the sensor 100-51*a* may be a touch or tactile sensor disposed proximate to the spine 100-11 which triggers and sends a "not in use" or "timeout" signal to the PCB 100-49 to the microprocessor 49-1*a* when the smart straight razor 100 is idle (i.e., not in use). In response to the timeout signal, the microprocessor 49-1*a* may execute a command to retract and return the disposable razor blade 100-23 back into the blade slot 100-21, preventing the razor blade 100-23 from causing potential injuries when not in use. In another aspect, programming instructions supported and executed by the microprocessor 49-1*a* for controlling the smart straight razor 100 or 200) may include, but are not limited, to C, C++, Java, Javascript, and Python, residing in memory 49-1*b* of the control unit 49-1. In another aspect, the user may customize the razor blade settings by programming and saving the blade positions/exposures into the memory 49-1*b* of the PCB 100-49.

Referring again to FIG. 14, the device driver unit 49-2 may communicate data through the I/O system 49-1*c* of the control unit 49-1. The vibrational motor actuator 49-2*a*, blade controller 49-2*b*, sensor hub 49-2*c*, haptic feedback controller 49-2*d*, display driver 49-2*e*, wireless transceiver 49-2*f*, human interface device HID controller 49-2*g*, and power management controller 49-2*h* relay device information to the control unit 49-1 to manage overall events and device operation of the smart straight razor 100 or 200). For example, the power management controller 49-2*h* in the device driver unit 49-2 is responsible for communicating sensing, measuring, and managing power levels from the battery 100-45 and relaying data back to the control unit 49-1 to initiate an appropriate response to an power event or condition, including but not limited to a response to: 1) notify the user of a current power level status via the display 100-35; 2) automatically shut-down the device when not in use; and 3) actuate the vibrating motor 100-43 in response to a low battery event. A list of related events, inputs, responses, and actions of the smart straight razor 100 are provided in Table 1, according to an embodiment.

TABLE 1

SMART STRAIGHT RAZOR EVENTS, ACTIONS, RESPONSES

| EVENT | INPUT SOURCE | DEVICE DRIVER | CONTROL UNIT - MICROPROCESSOR RESPONSE | SMART STRAIGHT RAZOR ACTION |
|---|---|---|---|---|
| Load/Unload Razor Blade | Razor Control Buttons, Optical Sensor, | Blade Controller, Optical Sensor, Display Driver, HID Controller | Actuate worm gear assemblies at predetermined load/unload position. | Razor Blade Tray ejected for new Blade insertion |

TABLE 1-continued

SMART STRAIGHT RAZOR EVENTS, ACTIONS, RESPONSES

| EVENT | INPUT SOURCE | DEVICE DRIVER | CONTROL UNIT - MICROPROCESSOR RESPONSE | SMART STRAIGHT RAZOR ACTION |
| --- | --- | --- | --- | --- |
| Adjust Razor Blade Depth | Razor Control Buttons, Blade Sensor | Blade Controller, Optical Sensor, Display Driver, HID Controller | Actuate worm gear assemblies (1 and 2) at a predetermined depth position. | Disposable Razor Blade is moved to a precise exposure depth position. |
| Adjust Razor Blade Tilt | Razor Control Buttons, Blade Sensor | Blade Controller, Optical Sensor, Display Driver, HID Controller | Actuate worm gear assembly 1 at a first predetermined depth position, Actuate worm gear assembly 2 at a second predetermined depth position. | Disposable Razor Blade is rotated to a precise tilt position. |
| Timeout Detection | Tactile Sensor | Power Management Controller (PMC) | Send signal to PMC to disable power from battery. | Automatic Power Off on Timeout signal. |
| Low Power Detection | Battery Sensor, Display | Motor controller, Power Management Controller (PMC), Display Driver | Send signal to PMC to disable power from battery. Output low power warning message via Display Driver or vibration signal to motor controller. | Automatic Power Off on Low Power. Display low power warning message on display. Generate tactile feedback response. |
| Software Update | Display, Razor Control Buttons | Wireless Transceiver, Display Driver | Update firmware to latest version (Y/N?) If yes, receive firmware update via Wireless Transceiver, save firmware in memory, update firmware to latest version, reboot device, confirm update to user via Display Driver. | Upon confirmation by user, update and save firmware code in memory. Reboot device upon update. Confirmation of update appears on Display. Generate tactile feedback response. |

As used in the specification and the appended claims, the singular forms “a”, “an”, and “the” included plural referents unless the context clearly dictates otherwise.

All patents, patent applications, and other references cited herein are incorporated by reference in their entireties.

It is noted that the foregoing disclosure has been provided merely for the purpose of explanation and is in no way to be construed as limiting of the present disclosure. Although the present disclosure has been shown and described with respect to several preferred embodiments thereof, various changes, omissions, and additions to the form and detail thereof, may be made therein, without departing from the spirit and scope of the disclosure. It is understood that the words which have been used herein are words of description and illustration, rather than words of limitation. Changes may be made, within the purview of the appended claims, as presently stated and as amended, without departing from the scope and spirit of the present disclosure in its aspects.

Other embodiments and modifications of the present disclosure may occur to those of ordinary skill in the art in view of these teachings. Accordingly, the disclosure is to be limited only by the following claims which include all other such embodiments and modifications when viewed in conjunction with the above specifications and accompanying drawings.

What is claimed is:

1. A smart straight razor comprising:

a blade enclosure member having internal motor-driven assemblies coupled to a blade tray assembly for receiving a razor blade;

a swing arm member coupled to the blade enclosure member, wherein a battery is disposed within the swing arm member; and a blade controller electrically coupled to the motor-driven assemblies for controlling the blade tray assembly, wherein the blade controller is configured to precisely control an exposure depth and/or a tilt of the razor blade for shaving hair.

2. The smart straight razor of claim 1, wherein the blade enclosure member is coupled to the swing arm member via a pivot joint, wherein the blade enclosure member or the swing arm member independently rotates about the pivot joint at least 180 degrees, allowing a user to fold the smart straight razor into a compact form when not in use or independently and rotationally adjust the blade enclosure member or the swing arm member to a comfortable and ergonomic shaving position.

3. The smart straight razor of claim 1, further comprising a pivot arm member having a first pivot joint and a second pivot joint, wherein the blade enclosure member is coupled to the pivot arm member at the first pivot joint and the swing arm member is coupled to the pivot arm member at the second pivot joint.

4. The smart straight razor of claim 1, wherein the blade controller is disposed within the blade enclosure member.

5. The smart straight razor of claim 1, wherein the blade controller is disposed within the swing arm member.

6. The smart straight razor of claim 1, wherein the blade tray assembly is configured to extend and retract from a blade slot disposed along a portion of the blade enclosure member for loading or unloading the razor blade onto the blade tray assembly.

7. The smart straight razor of claim 1, wherein a printed circuit board including a control unit and a device driver unit is disposed within the blade enclosure member.

8. The smart straight razor of claim 7, wherein the control unit includes a microprocessor, memory, and an I/O system which are interconnected by a system bus.

9. The smart straight razor of claim 7, wherein the device driver unit includes the blade controller for controlling one or more motors in the motor-driven assemblies, a vibrational motor actuator for actuating a vibrating motor, a sensor hub routing one or more sensors, a haptic feedback controller for controlling an haptic engine, a display driver for driving a display, a wireless transceiver for receiving and transmitting wireless data signals, a human interface device HID controller for managing control inputs received from the razor control buttons, and power management controller for managing and monitoring power levels of the battery.

10. The smart straight razor of claim 1, wherein razor control buttons are disposed on the blade enclosure member or the swing arm member, allowing a user to eject, load, set, and precisely control the exposure depth and/or a tilt of the razor blade.

11. The smart straight razor of claim 1, wherein a display is disposed on the blade enclosure member or the swing arm member for providing visual feedback on mode selection, battery level status, notifications, and alerts to a user.

12. The smart straight razor of claim 1, wherein the motor-driven assemblies are two independently controlled worm gear assemblies, wherein each worm gear assembly has a motor, a threaded worm shaft coupled to the motor, and a worm wheel having a blade pin coupled to a blade pin slot of the blade tray assembly.

13. The smart straight razor of claim 1, wherein a wireless charging coil is coupled to the battery for recharging the battery via an inductive charging pad or charging station that is connected to the power source.

14. The smart straight razor of claim 1, wherein the blade tray assembly includes a planar body having a recessed keyed tray that is structured to match and mate with a complementary shaped razor blade.

15. The smart straight razor of claim 14, wherein the keyed tray includes cut-outs or grooves, a notch, or a straight edge.

16. The smart straight razor of claim 1, wherein a tactile sensor is disposed on the blade enclosure member or the swing arm member for detecting whether a user's hand is applied to blade enclosure member or the swing arm member.

17. The smart straight razor of claim 1, wherein a battery sensor is coupled to the battery for measuring battery state levels.

18. The smart straight razor of claim 1, wherein an optical sensor is coupled to the blade tray assembly for identifying a type of razor blade that is loaded in the blade tray assembly.

19. The smart straight razor of claim 18, wherein an identification mark is applied to a portion of the razor blade.

20. The smart straight razor of claim 19, wherein the optical sensor detects the identification mark of the razor blade including alpha-numeric characters, barcodes, QR Code, or striped codes and digitally storing encoded specification and product information about the razor blade.

* * * * *